Oct. 28, 1952
C. E. A. O'LOUGHLIN
2,615,195
SCALE LIFTER
Filed July 24, 1946
3 Sheets-Sheet 1
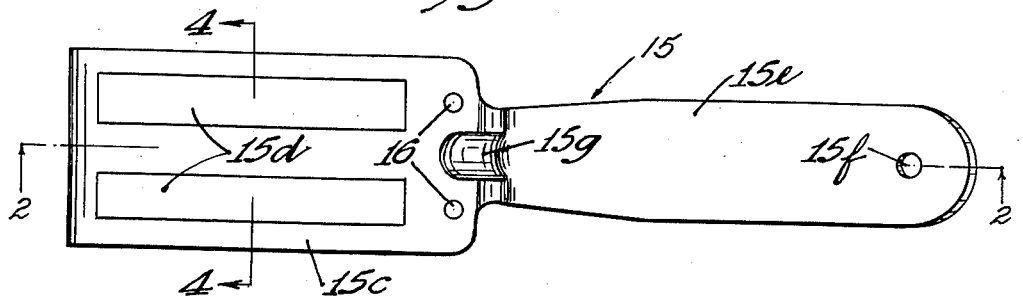
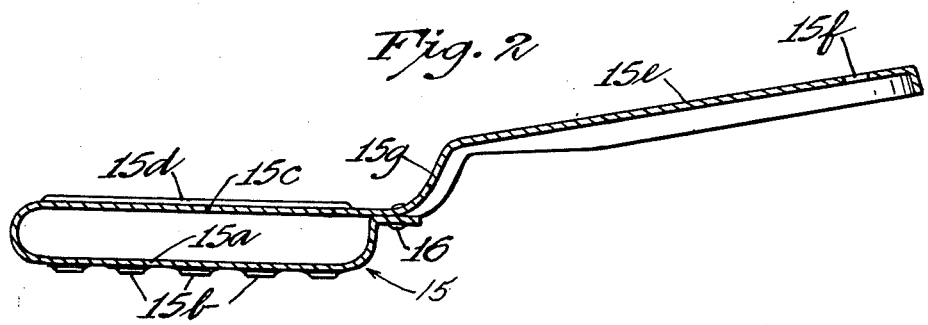
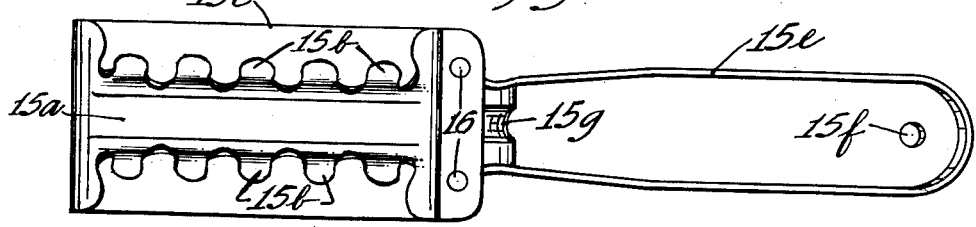
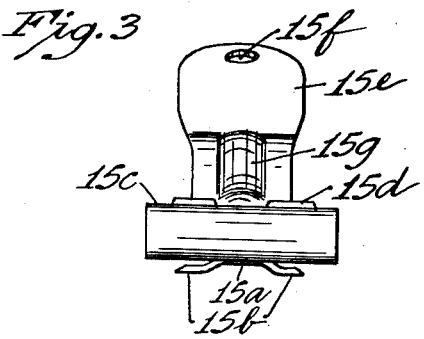
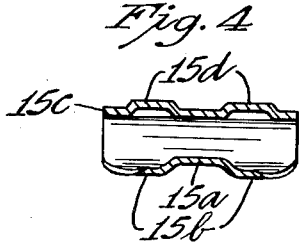
Inventor
Charles E. A. O'Loughlin
By Chas. C. Heif.
Attorney Oct. 28, 1952 C. E. A. O'LOUGHLIN 2,615,195
SCALE LIFTER
Filed July 24, 1946 3 Sheets-Sheet 2
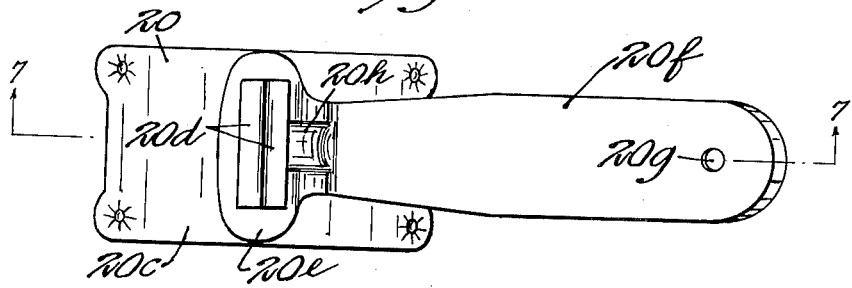
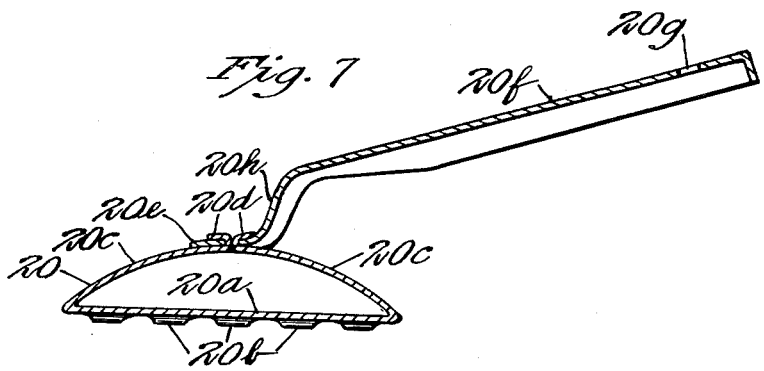
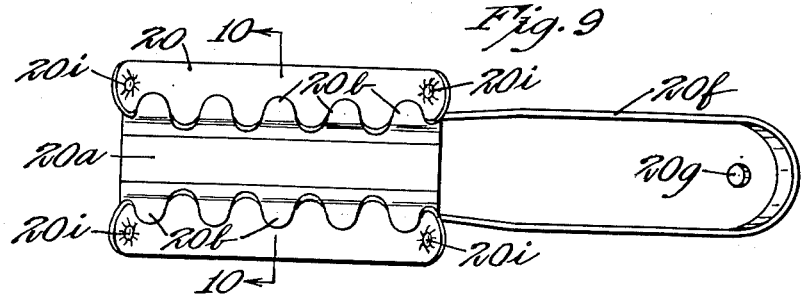
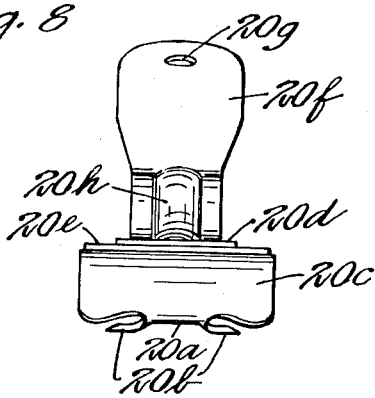
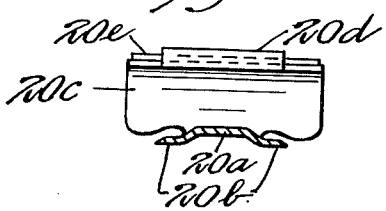
Inventor
Charles E. A. O'Loughlin
By Chas. C. Keyf
Attorney Oct. 28, 1952 C. E. A. O'LOUGHLIN 2,615,195
SCALE LIFTER
Filed July 24, 1946 3 Sheets-Sheet 3
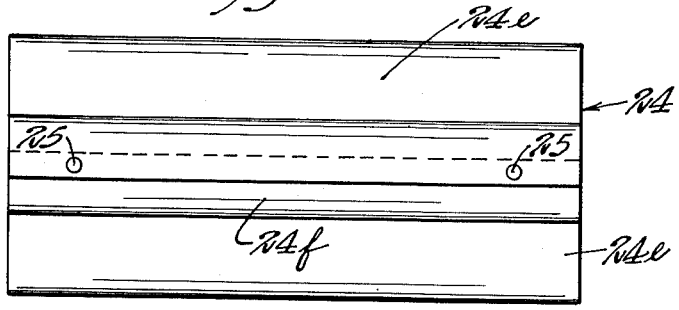
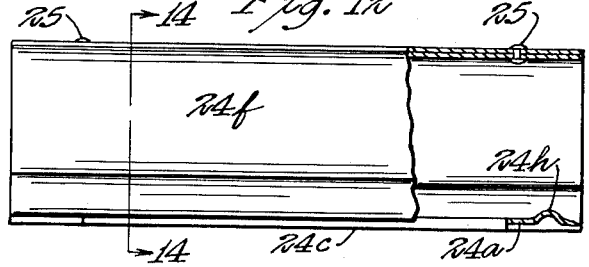
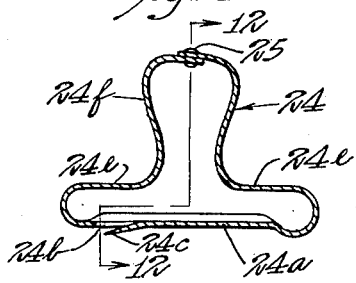
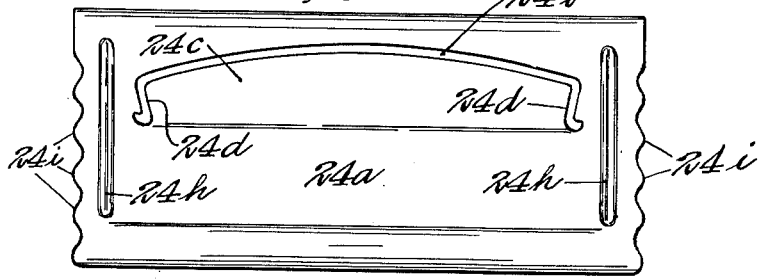
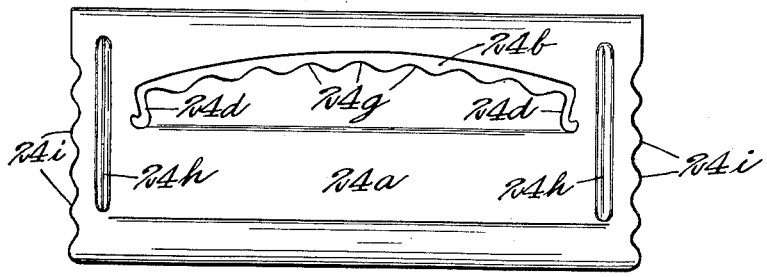
Inventor
Charles E. A. O'Loughlin
By
Attorney Patented Oct. 28, 1952

2,615,195

UNITED STATES PATENT OFFICE 2,615,195

SCALE LIFTER

Charles E. A. O'Loughlin, St. Paul, Minn.

Application July 24, 1946, Serial No. 685,851

4 Claims. (Cl. 17—7)

This invention relates to a device for removing the scales from fish. Such devices or fish scalers have been commonly used but the same have had several objectionable features. Many of the devices are so constructed that they do not properly or efficiently engage and remove the scales and many of said previous devices when in operation scatter the scales very widely.

It is an object of this invention to provide a simple and efficient structure of fish scaler and one which will prevent the scales from flying about.

It is a further object of the invention to provide a device for scaling fish which operates to lift the scales and thus to efficiently remove them and to keep the scales from being projected in various directions.

It is another object of the invention to provide a fish scaler comprising a plate preferably of elongated form and having spaced teeth projecting at one or both sides thereof, said teeth being offset so as to lie in a plane slightly below the plane in said plate together with a handle secured to said plate.

It is also an object of the invention to provide such a device as set forth in the preceding paragraph, together with a second plate spaced above said first mentioned plate and extending over said first mentioned plate and the teeth thereon.

It is more specifically an object of the invention to provide a fish scaler comprising a substantially horizontal plate having a blade or tooth-equipped blade formed therein and bent downwardly so that it can engage the scale of the fish, said plate also being equipped with or formed into a handle above said blade.

It is a further object of the invention to provide a fish scaler comprising a plate having a bottom horizontal portion, said plate having a blade preferably formed with teeth cut therefrom, said blade being depressed to have its edge below the plane of said plate, said bottom or horizontal portion having its sides reversely bent upwardly in curved form to lie above and space from said horizontal portion, said plate then extending upwardly to form a handle.

It is still another object of the invention to provide a simple and efficient method of constructing a fish scaler.

These and other objects and advantages of the invention will be fully set forth in the following description made in connection with the accompanying drawings in which like reference characters refer to similar parts throughout the several views and in which:

Fig. 1 is a top plan view of the device;

Fig. 2 is a central longitudinal vertical section taken on line 2—2 of Fig. 1 in the direction indicated by the arrows;

Fig. 3 is a view in end elevation of the device as seen from the left of Fig. 1;

Fig. 4 is a transverse vertical section taken substantially on line 4—4 of Fig. 1, as indicated by the arrows;

Fig. 5 is a bottom plan view of the device;

Fig. 6 is a top plan view of a modified form of the device;

Fig. 7 is a central longitudinal vertical section taken on line 7—7 of Fig. 6 in the direction indicated by the arrows.

Fig. 8 is a view in front elevation as seen from the left of Fig. 6;

Fig. 9 is a bottom plan view of the device shown in Fig. 6;

Fig. 10 is a transverse vertical section taken on line 10—10 of Fig. 9, as indicated by the arrows;

Fig. 11 is a top plan view of a modified form of the device;

Fig. 12 is a view in side elevation of the same, a portion being shown in vertical section taken substantially on line 12—12 of Fig. 14, as indicated by the arrows;

Fig. 13 is a bottom plan view of said latter device;

Fig. 14 is a vertical section taken on line 14—14 of Fig. 12, as indicated by the arrows; and Fig. 15 is a bottom plan view showing a further modification.

Referring to the drawings, particularly Figs. 1 to 5, a fish scaler is shown comprising a plate 15. Plate 15 has a portion 15a which is shown as somewhat elongated and is disposed in substantially a horizontal plane. Portion 15a has spaced teeth 15b projecting at opposite sides thereof and while these teeth might be variously formed, they are shown as somewhat rounded at their outer ends. The spaces between said teeth are rounded at their inner ends and these preferably extend somewhat into the sides of said teeth 15b so that said teeth are slightly reduced in width some distance from their fee ends. The teeth 15b are offset downwardly so that their outer ends lie in a plane slightly below the plane of portion 15a, as shown in Figs. 3 and 4. The inner ends of teeth 15b incline upwardly toward the portion 15a. The outer end portions of teeth 15b are sharpened by being beveled, as shown in Fig. 4.

As shown, plate 15 is reversely bent at one end and has a second portion 15c spaced from portion 15a and extending substantially parallel thereto. Portion 15c is of greater width than portion 15a so that it extends beyond and over the teeth 15b and covers the same. Portion 15c may be provided with spaced elongated raised portions 15d which are pressed upwardly therein. The rear end of portion 15a is bent upwardly in a curve substantially at right angles and is then again bent at right angles to be disposed beneath and in engagement with the rear end of portion 15c. Portions 15a and 15c are connected at said point of engagement in any suitable manner, as by the rivets 16. Portion 15c is continued rearwardly and extends upwardly and rearwardly and then rearwardly and upwardly at a reduced angle to form a handle portion 15e. The edges of portion 15e are bent downwardly, as shown in Figs. 2 and 5. Preferably a central raised portion or rib 15g is pressed upwardly in the inner portion of handle 15e. Handle 15e is preferably provided with a hole 15f so that the device may be hung on a support.

In operation the operator will hold handle 15e in one hand and will move the portion 15a lengthwise of the fish, the device being moved in a direction substantially at right angles to the sides of plate portions 15a and 15c. The outer ends of teeth 15b pass under the scales and the scales are lifted by the inner upwardly inclined portions of teeth 15b. This lifting motion separates the scales from the skin of the fish. The scales are thus not flexed or struck violently and thus do not fly about. The scales are not projected in various directions as is common with fish scalers. Should the scales be projected upwardly in the lifting operation, they strike the top portion 15c and are thus prevented from flying upwardly or being projected upwardly any great distance. The scales are thus confined largely within the device and along the surface of the fish. The device can be moved in opposite directions so that the teeth on either side operate and the scaling of the fish is performed very rapidly. The device does not tend to clog with scales and any scales lodging between the plate portions 15a and 15c can be readily discharged by holding the teeth vertically and tapping the device against any surface or object. The handle 15e is formed to be comfortably held in the hand.

In Figs. 6 to 10 a modified form of the device is shown comprising a plate 20 having a portion 20a which is similar to portion 15a and has teeth 20b projecting from each side thereof, which teeth are formed similarly to teeth 15b already described except that they are not reduced in width adjacent their ends. Teeth 20b are also offset downwardly so that their outer ends lie in a plane slightly below the portion 20a. The inner ends of said teeth 20b incline upwardly toward plate 20a and the outer ends of teeth 20b are sharpened just as are the outer endes of teeth 15b. Plate 20 is reversely bent rather sharply at each end of portion 20a to form a curved portion 20c spaced above portion 20a. Portion 20c is of greater width than portion 20a and teeth 20b so that it extends over and beyond said teeth 20b and covers the same. The ends of plate 20 forming portions 20c are provided with tongues 20d of smaller width than portions 20c and these tongues pass through a slot in the end 20e of a handle portion 20f. Tongues 20d are pressed downwardly on the top of portion 20e so that said handle portion 20e is firmly clamped between tongues 20d and the plate portions 20c. Handle 20f extends upwardly and rearwardly for some distance and then upwardly and rearwardly at a reduced angle, as shown in Fig. 7. The edges of handle portion 20f are bent downwardly, as shown in Fig. 7. Handle portion 20f has a hole 20g adjacent its outer end by means of which the device can be hung on a support. Handle 20f is preferably provided with an upwardly pressed central rib 20h at its portion adjacent plate 20c. The portion 20c is also preferably provided with downwardly pressed indentations 20i adjacent the corners thereof.

In operation the operator holds handle 20f in one hand and moves the portion 20a and teeth 20b along the fish lengthwise thereof, the device moving substantially at right angles to the sides of portions 20a and 20c. The scales will be engaged and lifted by teeth 20b and will be prevented from flying upwardly or being projected upwardly by plate portion 20c. The scales are quickly and efficiently removed and are not engaged so that they fly about or are projected in various directions.

Referring to Figs. 11 to 15 a device is shown comprising a plate 24 preferably formed of sheet metal, said plate having a bottom and substantially horizontal portion 24a. Portion 24a is substantially at the center of plate 24 and has cut therein at adjacent one side thereof a slot 24b. Slot 24b forms a blade portion 24c having a symmetrically curved longitudinal front edge and side portions 24d. The blade portion 24c is depressed below the plane of portion 24a, as shown in Figs. 12 and 14. Plate 24 at each side of portion 24a is reversely bent in curved and substantially cylindrical form to give the horizontal portions 24e disposed above and spaced from portion 24a. The portion 24g at the right of Fig. 14 which is the rear side of the device is bent downwardly somewhat below the plane of portion 24a, as shown in Fig. 14. From the portions 24e plate 24 extends upwardly in reversely curved form to form a handle 24f and has its edges overlapping at the top thereof and connected in any suitable manner as by the spaced rivets 25. The portion 24a adjacent its ends is provided with an upwardly pressed rib 24h. Beyond portions 24h the ends of portion 24a are provided with small teeth 24i. In Fig 15 blade 21c is shown as provided with teeth 24g of curved form.

In use the device shown in Figs. 11 to 15 will be grasped by the handle 24f and move along the side of the fish with the edge of blade 24c advancing as the device moves in a line substantially perpendicular to its long sides. The edge of blade 24c is preferably sharpened and as said depressed edge moves along the fish, said edge will engage under the scales and lift the scales so that they will be removed as the device progresses along the fish. The scales pass upwardly above portion 24a and between said portion and portions 24e. The scales can be easily removed by turning the device vertically and tapping it against any object or surface. The scales then readily drop out of the end of the device. In the operation the scales are removed without any of them flying about or being projected away from the device. Any such movement of the scales is prevented by the adjacent parts of portion 24e and as stated the lifted scales move into the scaler. The scaling operation can thus be very easily and quickly performed. The upwardly bent portions or ribs 24h add stiffness to the ends of the device. The teeth 24i at the ends of portion 24a are used to lift and remove the scales of the fish about the gills and head. Some small implement is desirable for working at said head and gill portions as well as working about some of the fins of the fish. The teeth 24i at the ends of the device are very efficient for such use. The bottom portion at the right, as shown in Fig. 14, which is some distance below the bottom portion 24a, rides on the side of the fish in the scaling operation so that the fish is engaged mostly by said portion and the blade 24c.

From the above description it will be seen that I have provided a simple, inexpensive and highly efficient device for scaling fish. The scales are lifted, quickly removed from the fish and are not caused to fly about. The device is comfortable to hold and is very easily operated. The same can be very inexpensively made. It preferably will be made of non-corrosive metal or will be plated with a non-corrosive plating. The device has been amply demonstrated in actual practice, found to be very successful and efficient and is being commercially made.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.

What is claimed is:

1. A device for scaling fish comprising a plate having spaced teeth projecting at the opposite side edges thereof and respectively extending in opposite directions, said teeth being offset so as to lie in a plane slightly below the plane of said plate and inclining upwardly to the plane of said plate at their inner ends, a second plate spaced above said plate and teeth and extending over the same, and a handle joining said plates projecting from said device.

2. The structure set forth in claim 1, said teeth having somewhat rounded ends and having side portions of reduced width inwardly of their free ends.

3. A device for scaling fish comprising a plate having spaced teeth projecting at the opposite sides thereof, said teeth at said sides extending respectively in opposite directions, a portion of said plate overlying said teeth and spaced above the same, and a handle projecting from said device.

4. A device for scaling fish comprising a plate having a horizontal portion with spaced teeth projecting at opposite sides thereof, said teeth being offset to be disposed in a plane slightly below the plane of said portion, a portion of said plate being disposed above and spaced from said first mentioned portion, said second portion being of greater width than said first mentioned portion, and a handle projecting from said second mentioned portion and joining thereto said first mentioned portion.

CHARLES E. A. O'LOUGHLIN.

REFERENCES CITED

The following references are of record in the file of this patent:

UNITED STATES PATENTS

| Number | Name | Date |
| --- | --- | --- |
| 360,301 | Jenness | Mar. 29, 1887 |
| 410,167 | Kent | Sept. 3, 1889 |
| 1,028,736 | Kell | June 4, 1912 |
| 1,263,526 | Calta | Apr. 23, 1918 |
| 1,872,887 | Casse | Aug. 23, 1932 |
| 1,979,748 | Kimmel | Nov. 6, 1934 |
| 2,072,103 | Ewald | Mar. 2, 1937 |
| 2,435,351 | Hay | Feb. 3, 1948 |